(12) United States Patent
Devine et al.

(10) Patent No.: US 6,542,901 B1
(45) Date of Patent: Apr. 1, 2003

(54) FORMATTING INPUT DATA FILE COMPATIBLE WITH WORKSTATION APPLICATION INTO FORMATTED INPUT DATA FILE COMPATIBLE WITH SECOND APPLICATION UTILIZING USER-CUSTOMIZED SETTINGS

(75) Inventors: Kathryn Willbrandt Devine, Morgan Hill, CA (US); Barbara Jean Kilburn, Saratoga, CA (US); Virginia W. Hughes, Jr., Hollister, CA (US); Joseph Davis Lea, III, Chapel Hill, NC (US); Letitia K. Lee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/450,067

(22) Filed: Nov. 29, 1999

(51) Int. Cl.[7] ............................................. G06F 17/30
(52) U.S. Cl. .................... 707/104.1; 707/3; 707/5; 707/10; 707/102; 707/513; 707/523; 709/245
(58) Field of Search ............... 707/1–4, 10, 100–104.1, 707/200–205, 500, 501.1, 522–524, 532, 513; 709/200–215, 245–246; 713/200–202; 345/835–866, 975, 764

(56) References Cited

U.S. PATENT DOCUMENTS

| | | | | |
|---|---|---|---|---|
| 5,551,030 A | * | 8/1996 | Linden et al. | 707/102 |
| 5,603,027 A | * | 2/1997 | Ohkami | 707/200 |
| 5,760,768 A | * | 6/1998 | Gram | 345/747 |
| 6,069,625 A | * | 5/2000 | Nielsen | 345/804 |
| 6,094,684 A | * | 7/2000 | Pallmann | 709/227 |
| 6,154,878 A | * | 11/2000 | Saboff | 707/203 |
| 6,253,236 B1 | * | 6/2001 | Troxel et al. | 709/203 |

FOREIGN PATENT DOCUMENTS

EP 0661651 A1 * 7/1995 .................... 17/30

* cited by examiner

Primary Examiner—Srirama Channavajjala
(74) Attorney, Agent, or Firm—Madson & Metcalf

(57) ABSTRACT

The present invention automatically formats input data compatible for use with a workstation application into formatted input data compatible with a host application. The input data is in one example updated to include customized settings, such as setup options. After the update, a format module, incorporated within the application, confirms completion of the update and automatically creates a formatted input data file which is compatible with the host application. A user interface is provided to allow selection of file identification and delivery options for the formatted input data. The formatted input data may be stored in a single location, such as on a host, where it can be used with both a workstation and the host. Formatting of the input data may be automatic and transparent to the user. User implementation of file identification and delivery options allows for convenient manipulation of the formatted input data.

29 Claims, 4 Drawing Sheets

FORMATTING INPUT DATA FILE COMPATIBLE WITH WORKSTATION APPLICATION INTO FORMATTED INPUT DATA FILE COMPATIBLE WITH SECOND APPLICATION UTILIZING USER-CUSTOMIZED SETTINGS

BACKGROUND OF THE INVENTION

1. The Field of the Invention

The present invention relates to systems for formatting input data for complex computer programs and, more specifically, to formatting customized input data including setup options for program installation.

2. The Relevant Technology

The ability to network and interact with different computer stations provides great benefits in the form of improved program accessibility and communications, thereby promoting productivity. The computer software industry is experiencing a great explosion in the growth and capability of such network technology. In networks, computer stations are equipped with software applications or tools for performing specific and often highly complex functions. The rapid generation of increasingly complex computer technology has caused these applications to become more sophisticated and to provide benefits on a scale previously unseen.

Commonly, it is desirable to share data relating to these applications between one or more computer stations. Transmittal of such applications is readily available on local and wide area networks. Issues of compatibility are often a concern between applications, however, and have been addressed in numerous instances. Greater compatibility allows for improved access between applications and greatly improves productivity. As computer networking continues to increase as a dominant feature, such compatibility issues will only increase.

Often, computer compatibility issues are resolved by ensuring that computer workstations are running the same application. Thus, data is easily read by the same application. In other instances, applications, such as word processing tools, include formatters to reformat an imported work product to be compatible with the application. The convenience and ease with which many products may be assimilated by other applications is greatly appreciated by all in the computer industry.

In some instances, an application runs on a host or mainframe and another application which performs similar functions runs on a workstation networked to the host. Often times, data produced or inputted into the host and the workstation application is compatible with one another. Thus, transference of the data between the host and the workstation is readily available. However, in some instances the workstation and host applications do not read or produce compatible data. For example, a host running OS/390 reads input data which is incompatible with a workstation running an installer program, such as DB2 installer. When input data from the host is desired, the installer must format the input data into a format compatible with the installer. Such formatting allows a workstation application to benefit from the input data available on the host.

Quite often the input data now residing at the workstation and in a format compatible with the workstation is updated with user preferences. Such user preferences may include customized settings to the application. It is often advantageous to be able to transfer the customized settings freely between workstations and the host without dealing with incompatibility concerns. Thus, others may share from the benefit the time and effort spent by a user to develop the customized settings.

Presently, a method does not exist for a user to map or format updated input data from an installer application, such as DB2 installer, back to a host application, such as OS/390. Thus, if customized settings are desired at the host application, a user must print out a hard copy of updated input data, including the customized settings. The user must then manually locate the customized settings and manually match the customized settings to the appropriate locations in the input data for the host application.

A user generally performs the manual operation rather than lose the work performed in customizing and setting input parameters. Manual typing of the input data creates numerous opportunities for errors especially where the input data is very position sensitive. It is often very difficult to make changes to input data and confirm that all of the changes are made. For example, an extra space in a parameter value may make the input member invalid. Furthermore, manually examining the updated input data and overtyping the input data at the host is extremely tedious, frustrating, and results in lost productivity.

Thus, it would be an advancement in the art to provide a system and method which automatically provides updated input data in a format compatible for a host application to thereby eliminate intervention by a user.

It would be a further advancement in the art to provide such a system and method which further includes a user interface for identifying, moving, and storing the updated input data on the host application.

BRIEF SUMMARY OF THE INVENTION

The apparatus of the present invention has been developed in response to the present state of the art, and in particular, in response to the problems and needs in the art that have not yet been fully solved. Thus, it is an overall objective of the present invention to provide a system and method for automatically formatting customized input data for use by incompatible applications.

The present invention is intended for use with a system having an application at a workstation, such as an installer. The application utilizes input data which is stored in a format compatible with the application. The input data is updated by a customization function to incorporate customized settings, such as setup options. The input data is thereby customized by a user for operating the application.

A format module resides on the workstation and, in one embodiment, is incorporated into the application. Upon an update of customized settings into the input data, the format module is invoked to automatically create formatted input data which is compatible with a second application. The second application may reside on another workstation, such as a host. Before commencing, the format module confirms that the update of the customized settings is complete.

During the format operation, the format module utilizes an index and parse rules to map data objects in the input data to corresponding locations in the formatted input data. In this manner, the formatted input data is configured to be compatible with a second application. A user interface is provided to allow selection of file identification and connection and delivery options of the formatted input data.

The customized input data that was previously only usable on the first application is now made accessible by a host or another workstation running the second application. The input data may be stored in one location, such as on the host, and yet can be used for both workstations and the host. Thus, the customized settings may be shared by additional workstations who need not recreate the customized settings. Formatting of the input data is automatic and transparent to the user. User implementation of file identification and delivery options allows for convenient manipulation of the formatted input data.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

Figure 1:
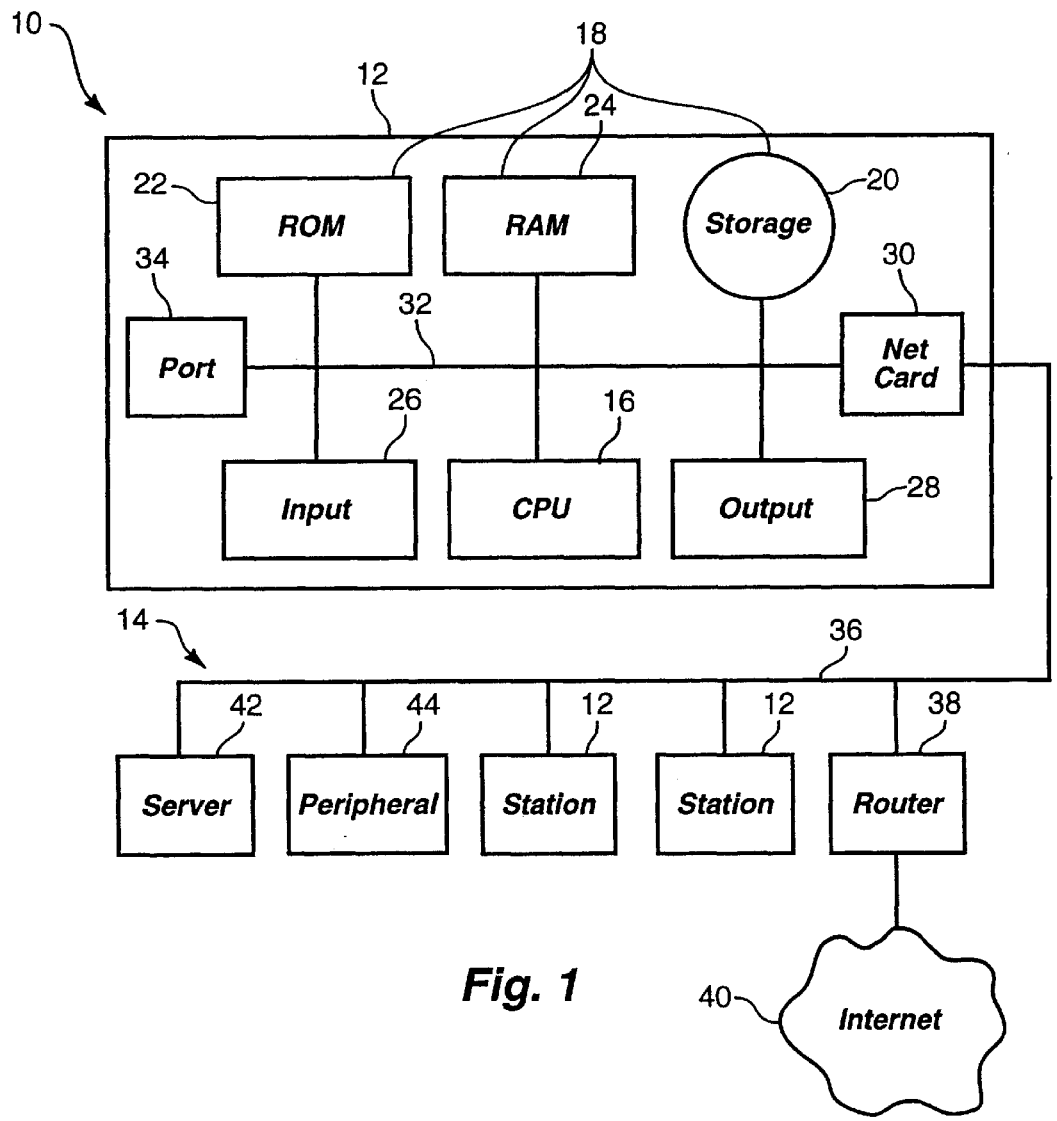
FIG. 1 is a schematic block diagram illustrating one embodiment of a computer system for implementing the format system of the present invention.

FIGS. 1 through 4 are schematic block diagrams and flow chart diagrams which illustrate in more detail certain embodiments of modules, executables, and operational data for operation within a computer system of FIG. 1 in accordance with the present invention.

FIG. 1 is a schematic block diagram which illustrates a computer system 10 in which executables and applications, operating in accordance with the present invention, may be hosted on one or more computer stations 12 in a network 14. The network 14 may comprise a wide area network (WAN) and may also comprise an interconnected system of networks, one particular example of which is the Internet and the World Wide Web supported on the Internet.

A typical computer station 12 may include a processor or CPU 16. The CPU 16 may be operably connected to one or more memory devices 18. The memory devices 18 are depicted as including a non-volatile storage device 20 such as a hard disk drive or CD ROM drive, a read-only memory (ROM) 22 and a random access volatile memory (RAM) 24.

The computer system 10 may also include an input device 26 for receiving inputs from a user or from another device. Similarly, an output device 28 may be provided within or be accessible from the computer system 10. In one embodiment the output device 28 is a conventional display device such as a CRT or flat panel display.

A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Internally, a system bus 32 may operably interconnect the CPU 16, the memory devices 18, the input devices 26, the output devices 28 the network card 30, and one or more additional ports 34. The system bus 32 and the network backbone 36 may be thought of as a data carrier. As such, the system bus 32 may be embodied in numerous configurations. Wire, fiber optic line, wireless electromagnetic communications by visible light, infrared, and radio frequencies may likewise be implemented as appropriate for the system bus 32 as well as the network 14.

In general, the network 14 may comprise a single local area network, a wide area network, several adjoining networks, an intranet, or as in the manner depicted, a system of interconnected networks such as the Internet. The individual stations 12 on the network 14 may have varying degrees and types of communication capabilities and logic capability. Different communication protocols, e.g., ISO/OSI, IPX, TCP/IP, may be used on the network, but in the case of the Internet, a single, layered communications protocol (TCP/IP) enables communications between the differing networks 14 and stations 12.

The network 14 may include a backbone 36 for interconnecting the stations 12. A router 38 may also connect to one or more other networks, including the Internet 40. The network 14 may be a local area network (LAN), wide area network (WAN) or any size of internetwork. The stations 12 communicate with each other over the backbone 36 and/or over the Internet 40. Thus, a communication link may exist, in general, between any of the stations 12.

The network 14 may include a server 42 used to manage, store, communicate, transfer, access, update, and the like any member of files for the network 14. The network 14 may further include a peripheral 44 which may be embodied as one of any number of devices such as a printer or backup scanner, tape drive.

Figure 2:
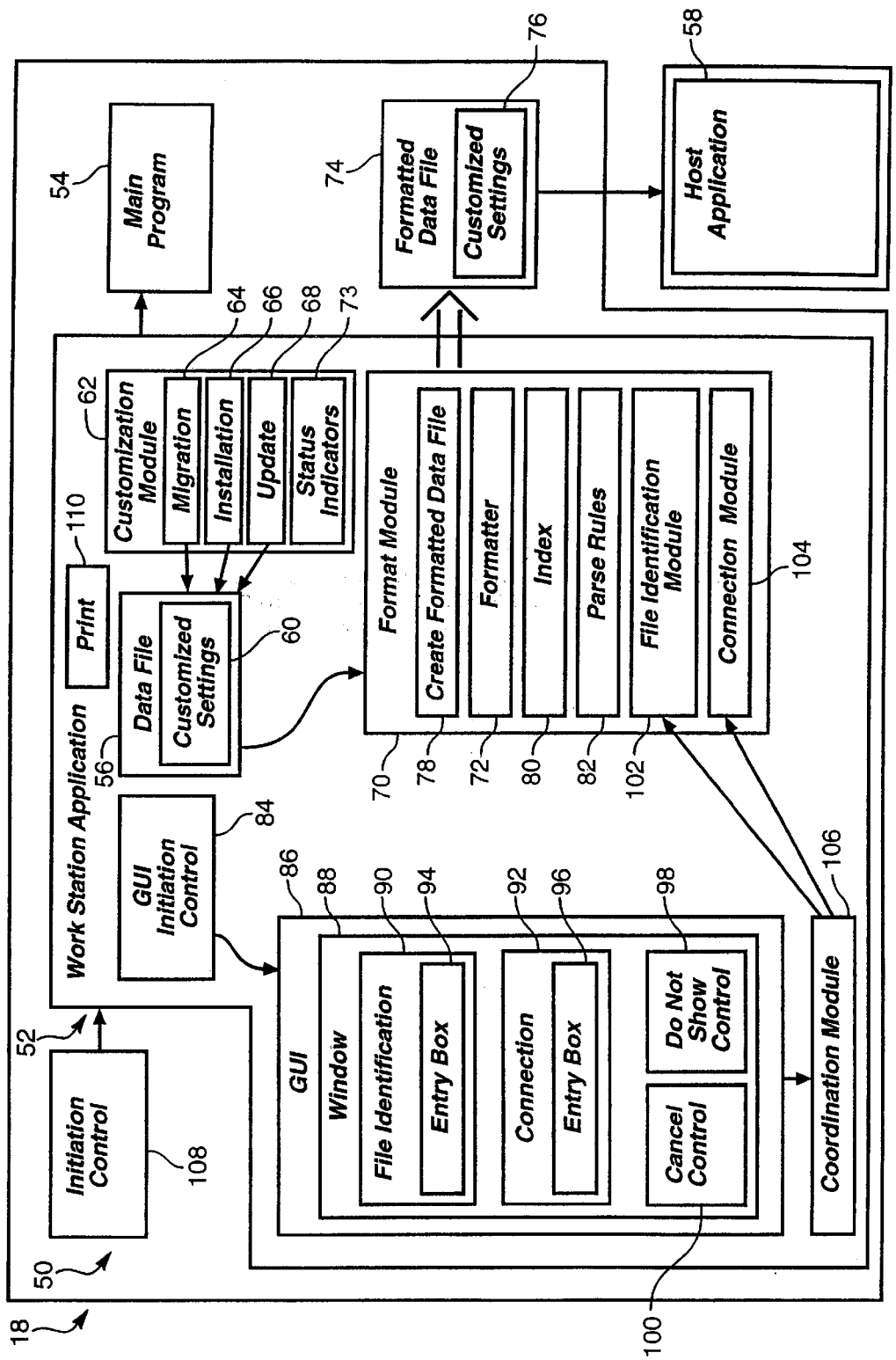
FIG. 2 is a schematic block diagram illustrating one embodiment of a format system of the present invention.

Referring to FIG. 2, the format system 50 of the present invention, in one embodiment, includes a plurality of executable and operational modules suitable for operation within the memory devices 18 of FIG. 1. Of course, the memory devices 18 in which the modules of the present invention are located may also be distributed across both local and remote computer stations 12.

The format system 50 includes a workstation application 52 and, in the depicted embodiment, resides on the memory device 18 of a computer station 12. For reference, the computer station 12 having the workstation application 52 is referred to as the workstation.

The workstation application 52 may be embodied as various programs. The programs may include tools for receiving input data that affects the functions performed by the tools. In one embodiment, the workstation application 52 is embodied as an installer, such as DB2 installer, which is used to install a complex main program 54 with selected setups and configurations. In the case of the DB2 installer, the main program 54 is DB2, a sophisticated and highly robust database management system produced by IBM. Nevertheless, the workstation application 52 may exist independent of the main program 54 and may serve as a tool for purposes other than program installation. Accordingly, the features and benefits of the present invention may be applied to a computer program, such as the workstation application 52, without the presence of the main program 54.

The workstation application 52 contains a data file 56 of input data. The data file 56 formatted to be compatible for use with the workstation application 52. In one embodiment, the data file 56 is formatted as a parameter dictionary (PD) for use with the DB2 installer. In this embodiment, the parameter dictionary is formatted into arrays of parameters with each parameter having objects, including parameter values. The data file 56 may comprise combinations of data such as binary, GUI, operational data, and methods. In the embodiment of DB2 installer, the workstation application 52 is the only application presently capable of reading the data file 56.

In one embodiment, the data file 56 is created during an installation of the workstation 52. In such an embodiment, the data file 56 comprises predefined defaults of input data.

In another embodiment, the data file 56 may be downloaded to the workstation 12 from a host application 58 resident on a host. The host application may be embodied as another computer station 12 on the network 14. In the depicted embodiment, the host application 58 contains the data file 56 in a format which is compatible with the host application 58, but which is not compatible with the workstation application 52. When the data file 56 is downloaded to the workstation application 52, the data file 56 must be formatted into a format compatible for the workstation application 52. Thus, the data file 56 is a reflection of current input data residing on the host application 58.

In one embodiment, the host application 58 is the OS/390 operating system. In such an embodiment, the data file 56 is a partition data set (PDS) file which is compatible as input data for OS/390. Thus, the initial loading of the data file 56 from the host to the workstation requires formatting of the data file 56 from a PDS format to a PD format.

After the data file 56 is transmitted to the workstation application 52, the data file 56 may be updated by a user at the workstation 12. The updates may be any changes to the data stored on the data file 56. Alternatively, the updates may be customized settings 60. The customized settings 60 are user preferences which affects operation of the workstation application 52. The customized settings 60 include numerous options and may be specific to the operation of the workstation application 52.

In the given embodiment where the workstation application 52 is an installer, the customized settings 60 are preferably customized setup options. The customized setup options affect installation, configuration, and end functions of the main program 54 which is being installed.

The customized settings 60 are in a format compatible with the workstation application 52. Thus, the customized settings 60 are not readable by the host application 58. The host application 58 is able to access the data file 56 and customized settings 60 but is unable to incorporate the customized settings 60. The customized settings 60 must therefore be applied in a format compatible with the host application 58.

The customized settings 60 may be incorporated into the data file 56 by operation of customization events which are enabled by a customization module 62. The customization events occur during migration 64, installation 66, and update 68 functions. The migration 64, installation 66, and update 68 functions are operated by their respective modules indicated in FIG. 2 and included within the customization module 62.

In the migration function 64, a preexisting data file 56, including the customized settings 60, is loaded into the workstation application 52 from another application, such as a previous version of the workstation application 52. In the installation function 66, the workstation application 52 is installed and prompts a user to set up or modify install options. The user selects specific install options as desired which results in customized settings 60 being incorporated into the data file 56. If the user does not utilize the install options, then the customized settings 60 are established as default settings. In the update function 68, a user is able to modify options as desired which likewise results in customized settings 60 being incorporated into the data file 56. The update function 68 is typically used as desired and at a time other than during installation or migration.

The invention further comprises a format module 70 which takes the data file 56 and formats the data file 56, including the customized settings 60, into a format compatible for the host application 58. The format module 70 comprises a formatter 72 which automatically determines if an update of customization settings 60 to the data file 56 has occurred. As referenced herein the term "automatically" is defined as not requiring user instigation, intervention, or notification. Thus, an operation that is performed automatically may be performed transparent to the user.

In one embodiment, the formatter 72 may receive an indication of an update from the migration, installation, or update functions 64, 66, 68. Alternatively, the formatter 72 may periodically review the data file 56 to determine if an update has occurred. The formatter 72 further determines if the update of the customized settings 60 to the data file 56 is complete in order to begin formatting of the data file 56. In one embodiment, the formatter 72 is sensitive to status indicators 73 which are generated by the individual migration, installation, and update functions 64, 66, 68. The status indicators 73 reflect the status of the data file 56 and the customized settings 60. Once the update of the data file 56 with the customized settings 60 is complete, the formatter 72 automatically commences format of the data file 56.

The formatting of the data file 56 with the customized settings 60 may commence before the migration, installation, or update function 64, 66, 68 is complete. All that is required is that the update of the data file 56 is sufficiently complete. In one embodiment, the migration function 64 performs the steps of:

(1) loading preexisting options from a previous application;

(2) setting up new functions in the new workstation application 52;

(3) modifying migration options;

(4) generating migrations jobs;

(5) running migration jobs;

(6) running previous application jobs; and (7) and running the workstation application 52 jobs.

After step (2) and (3), setting up new functions and modifying migration options, the customized settings 60 are incorporated into the data file 56. At this point, the update to the data file 56 is complete and formatting of the data file 56 may begin.

In one embodiment, the installation function 66 performs the steps of:
(1) setting up install options and/or modifying install options;
(2) generating install jobs;
(3) running install jobs; and
(4) running sample jobs.

After step (1), setting up and/or modifying the install options, the customized settings 60 are incorporated into the data file 56. The data file 56 is now ready for formatting.

In one embodiment, the update function 68 simply requires the step of modifying existing customized settings 60, such as install options. The data file is ready for formatting after this step.

Upon completion of an update of customized settings 60, the formatter 72 automatically formats the data file 56. Thus, no initiation by the user or notification to the user is required. A user need not be prompted to proceed with the format of the data file 56 as the processing time to format is relatively short. The advantage is that upon any update of customized settings 60, the format module 70 conveniently prepares a formatted data file 74 which is compatible with the host application 58.

The formatted data file 74 includes customized settings 76 which are readable by the host application 58. At any time, the formatted data file 74 may be uploaded to the host application 58 and the host application 58 may utilize the customized settings 76. Thus, the process requires no effort on the part of the user and is not subject to user error as could occur during a manual format.

The format module 70 comprises a create formatted data file program 78 which is invoked at the beginning of the format operation to create and open a formatted data file 74. The formatted data file 74 thus created initially contains default values unless the formatted data file 74 has been previously created during a prior update.

During the format operation, the formatter 72 retrieves individual objects from the data file 56. The objects may correspond to specific parameters. The objects include a variety of data types including values, strings, characters, blanks, and so forth. The formatter 72 places the objects in appropriate corresponding locations in the formatted data file 74. This must be done without any errors to ensure that the formatted data file 74 is compatible and readable by the host application 58.

An index or table of keys 80 is used by the formatter 72 to identify the data type for each object and align the position of the object in the formatted data file 74 based on the object's type, location in the data file 56, and relation to a parameter. The objects include several different data types and the format operation must be sensitive to the different data types to provide appropriate mapping of the objects.

In one embodiment, the index 80 was previously created and used to format an initial data file resident on the host application 58 and compatible with the host application 58. The initial data file is downloaded to the workstation 12 and then formatted by the workstation application 52 into a format compatible with the workstation application 52. Thus, the is formatter 72 re-utilizes the existing index 80.

The formatter 72, further uses parse rules 82 to segment and align the positions of the objects in the formatted data file 74. The host application 58, such as OS/390, is often extremely sensitive to errors in object positions. Slight inconsistencies in the placement of objects may result in an unusable formatted data file 74. For example, in the embodiment of PDS, the formatted data file 74 is column dependent and offsetting the position of an object or inserting an extraneous space may render a parameter unreadable by the host application 58.

In the embodiment of an installer, such as DB2 installer, the formatter 72 identifies the parameter names of the data file 56 which is embodied as a parameter dictionary file. The formatter 72 copies the parameter names to the formatted data file 74 which, in one embodiment, is embodied as a partition data set file. The formatter 72 takes each parameter name and utilizes the index 80 to map the parameter name to corresponding objects in the appropriate field in the parameter dictionary file. The formatter 72 places the objects in relation to the parameter name in the formatted data file 74 with application of the parse rules 82.

Upon creation of the formatted data file 74, a user interface may thereafter be enabled to provide options for the formatted data file 74. The options may include file identification and network connection options to identify and deliver the formatted data file 74. In the depicted embodiment of FIG. 2, the user interface comprises a GUI initiation control 84 which is implemented for calling up a GUI 86 and an accompanying window 88. The user may invoke the GUI 86 by specific command when the user is ready to identify or transmit the formatted data file 74. Alternatively, the GUI initiation control 84 may automatically invoke the GUI 86 upon creation or update of the formatted data file 74.

The window 88 serves to allow a user access to one or more controls which manipulate the formatted data file 74. Within the window 88, one or more controls 90, 92 may be implemented to enable operation of functions to manipulate the formatted data file 74.

The file identification control 90 invokes a control to allow identification options of the formatted data file 74. In the depicted embodiment, the file identification control 90 comprises an entry box 94 to enable user input for information reflecting the file identification. If a file name is not entered into the entry box 94, then a default name is assigned to the formatted data file 74. The file identification control 90 may further be embodied in various forms of a dialog to prompt a user for the name of the formatted data file 74 or if the formatted data file 74 is going to overwrite a preexisting data file.

The connection control 92 invokes a control to deliver the formatted data file 74 to a destination. The connection control 92 includes an entry box 96 to enable user input for the destination. The destination may include the host or any other workstation 12 which may be accessed across the network 14. The connection control 92 may further be embodied in various forms of a dialog and, in addition to specification of destination, may also allow for options relating to the connection information, identifying the workstation, identifying the user, and password options.

Options for performing other controls may also be accessible through the window 88. For instance, a "do not show in the future" control 98 may be implemented to prevent the window 88 from automatically being called up upon an update of the data file 56. Also, a "cancel" control 100 may be provided to allow the user to back out of the window 88.

In one embodiment, the controls 90, 92 are linked with file function modules 102, 104 by a coordination module 106. Upon selection of one of the controls 90, 92 the coordination module 106 is called and calls up or otherwise launches the selected file function module 102, 104. The coordination module 106 may be implemented in any suitable manner, is including a direct link between the controls 90, 92 and the file function modules 102, 104.

The file identification module 102 is invoked to perform operations relating to file identification options. Thus, the file identification module 102 acts upon user input entered through the file identification control 90 to name the formatted data file 74 or overwrite an existing formatted data file 74.

The connection module 104 is invoked to perform operations relating to the delivery of the formatted data file 74. The connection module 104 acts upon selected options entered through the connection control 92 regarding the destination of the formatted data file 74. The connection module 104 further acts in response to additional identification of the formatted data file 74, such as the originating workstation and user, and password options.

The formatted data file 74 serves as input data to the destination workstation. Thus, the formatted data file 74, including the customized settings 76, serves as customized input to the host application 58 or to other workstations to allow users from different locations to share in the customized input data.

The workstation application 52, may be invokable through an initiation control 108. The initiation control 108 may, for example, comprise a passed parameter or a link to an operating system of the computer station 12 through which the workstation application 52 is automatically called up and made accessible to a user. The initiation control 108 may also be a call line to access the workstation application through an operating system. In a further example, the initiation control 108 may be an auto-run function.

In one embodiment, the workstation application 52 may further include a print module 110 to allow printing of a hard copy of the data file 56 and the formatted data file 74.

Figure 3:
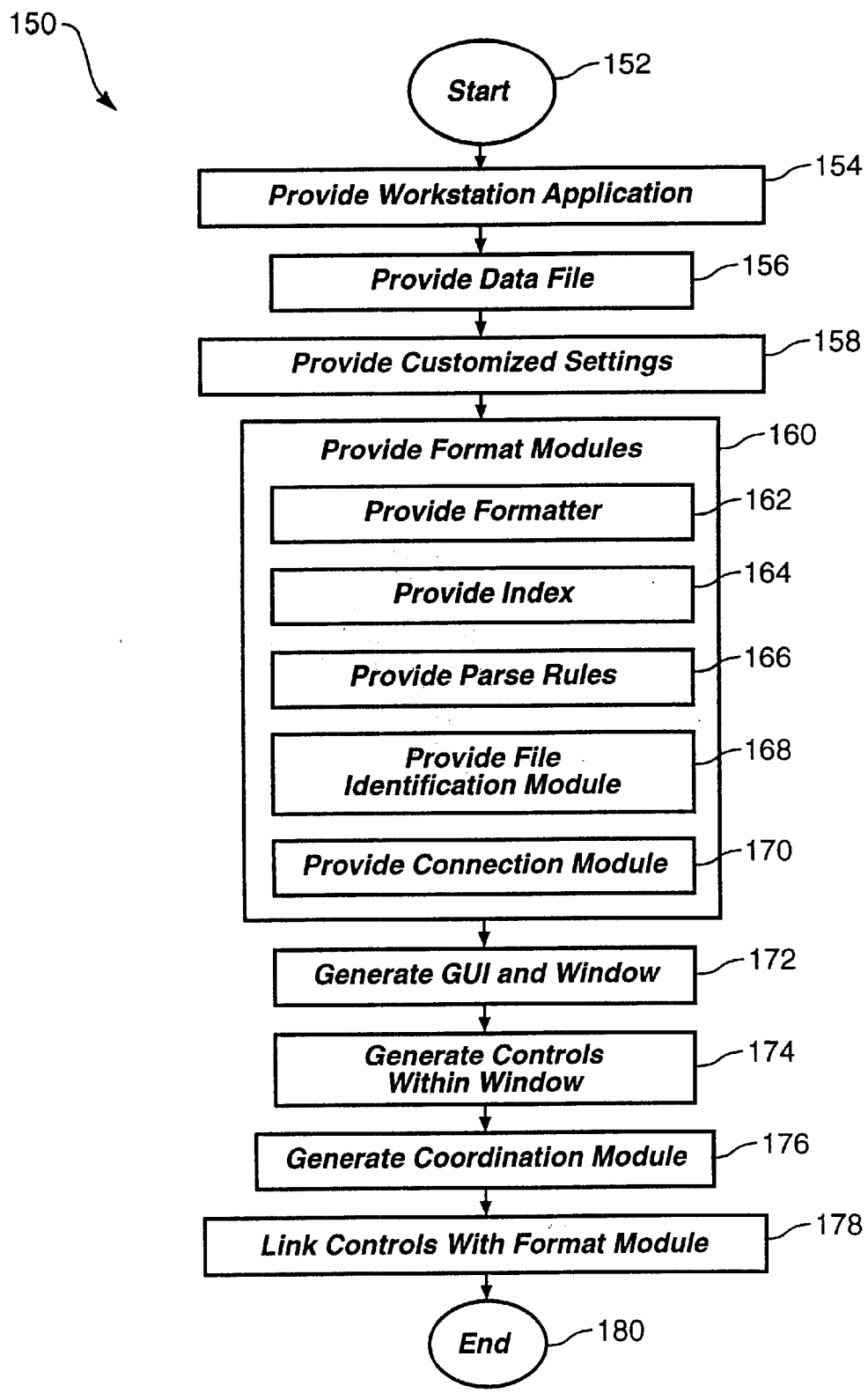
FIG. 3 is a schematic flow chart illustrating one embodiment of a process for generating the format system of FIG. 2.

FIG. 3 is a schematic flow chart diagram illustrating a process 150 for generating the formatting system 50 of FIG. 2. The process 150 of FIG. 3 begins at a start block 152. A subsequent block 154 represents a step in which the workstation application 52 of FIG. 2 is provided. The step of providing the workstation application 52 may comprise coding, manufacturing, and/or distributing the workstation application 52. It may also comprise merely procuring the workstation application 52 through commercial channels.

In a further step, represented by a block 156, the data file 56 is provided. The data file 56 may be derived from default settings within the workstation application 52 or may be downloaded from another application such as the host application 58.

At a block 158, the customized settings 60 are provided. Providing the customized settings 60 may be conducted in the manner previously explained, through implementation of the migration, installation, and update functions 64, 66, 68. Alternatively, the customized settings 60 may be provided in different ways such as downloading the customized settings 60 from another source and through another function.

At a block 160, the format module 70 is provided. This may comprise the actual physical generation of the format module 70 or merely the procurement of the format module 70. At blocks 162, 164, 166, 168, and 170, and included within block 160, the components of the format module 70 are provided including the formatter 72, the index 80, the parse rules 82, the file identification module 102, and the connection module 104.

At a block 172, the GUI 86 is generated. In one embodiment, the GUI 86 is coded through a high level program adapted to the production of graphical user interfaces. Concurrently, the window 88 is also provided and displayed on a display device 28.

At a block 174, the controls 90, 92 are generated and displayed within the window 88. The controls 90, 92 may be implemented in any known fashion, including through high level programs capable of automatically generating graphical user elements such as windows, buttons, and text entry boxes.

At a block 176, the coordination module 106 of FIG. 2 is generated. At a block 178, the controls 90, 92 are linked with the functions 102, 104. At a block 180, the process 50 terminates.

Figure 4:
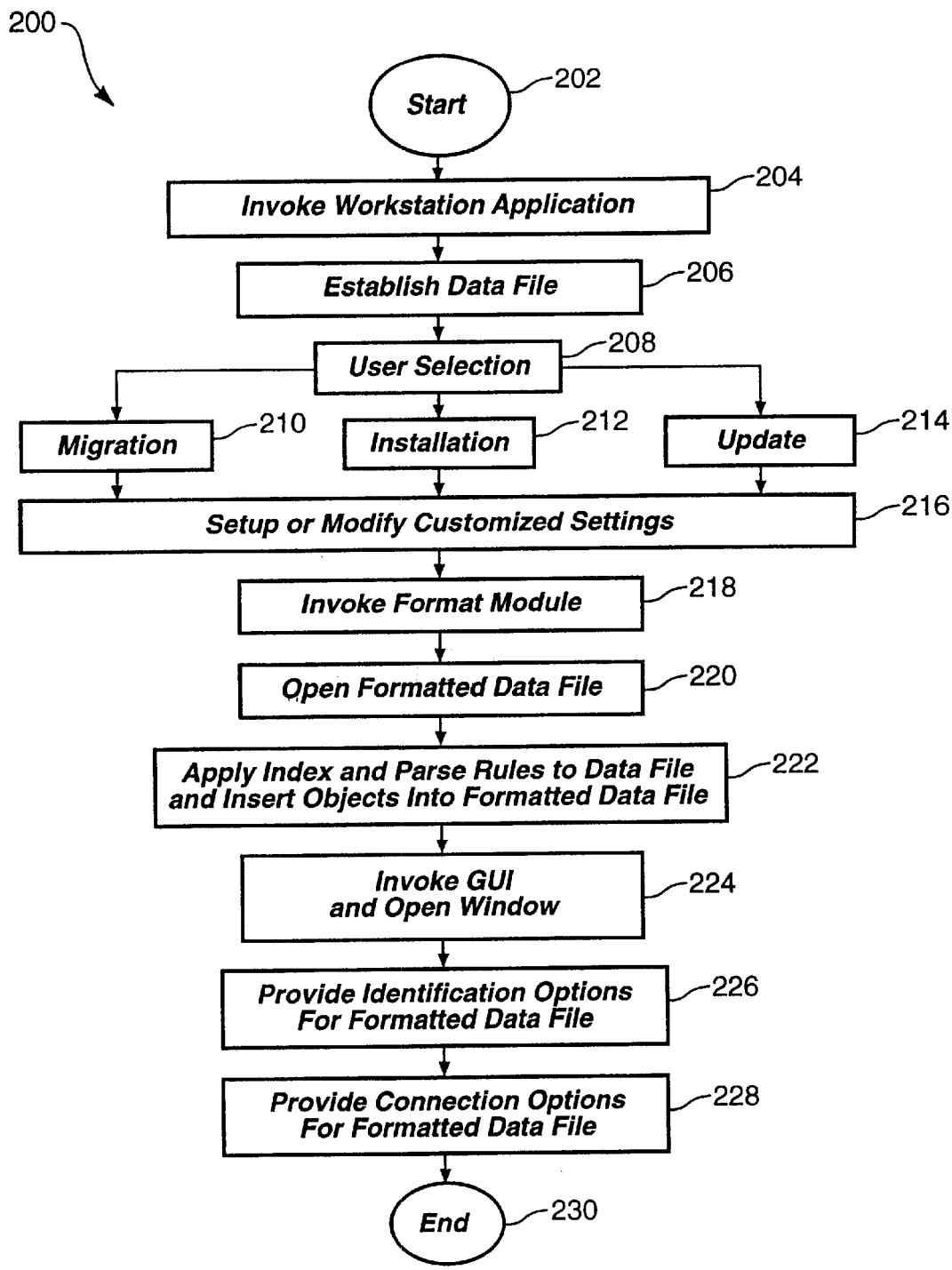
FIG. 4 is a schematic flow chart illustrating one embodiment of a method of using the format system of FIG. 2.

FIG. 4 is a schematic flow chart representing the various steps of a method 200 of using the format system 50 of FIG. 2. At a block 202, the method 200 starts. At a block 204, the workstation application 52 may be invoked using the initiation control 108 or by other methods as desired.

At a block 206, the data file 56 is established. As previously stated, the data file 56 is an input data file and may be downloaded from another computer station 12 or may comprise default settings.

At a block 208, the user may select the migration, installation, or update functions 64, 66, 68 which are represented by blocks 210, 212, and 214 respectively. Each of these functions allow for an update of customized settings 60 into the data file 56.

At a block 216, the user may setup or modify customized settings 60 to thereby customize the data file 56. The customized settings 60 are setup or modified in the course of performing a migration, installation, or update function 64, 66, 68.

At a block 218, the format module 70 is invoked in response to the update of customized settings 60 to the data file 56. The format module 70 is invoked automatically without user initiation to thereby allow for seamless operation which is transparent to the user.

At a block 220, the create formatted data file program 78 is invoked to create and open a new formatted data file 74. Alternatively, the program 78 may find and retrieve an existing formatted data file 74 if an update of customized settings 60 has been previously performed.

At a block 222, the formatter 72 is invoked to apply the index 80 and parse rules 82 to objects in the data file 56. The objects are then inserted in appropriate locations in the formatted data file 74 to create a formatted data file 74 which is compatible with the host application 58. In this manner a data file 74 is created which is customized based on user preferences at the workstation 12 and is now readable by the host application 58.

At a block 224, the GUI 86 may be invoked through the use of a control 84 which may be initiated by the user. Alternatively, the GUI 86 may be invoked automatically upon creation of the formatted data file 74. The GUI 86, in turn, opens the window 88 which is displayed on a display device 28.

At a block 226, the file identification control 90 is displayed on the display device 28. The user may invoke the file identification control 90 to identify the formatted data file 74 with a desired name. The coordination module 106, correspondingly, invokes the file identification module 102. The user is prompted for a file name and the file name or a default name is attached to the formatted data file 74.

At a block 228, the connection control 92 is displayed on the display device 28. The user may invoke the connection control 92 to transmit the formatted data file 74 to another workstation 12, such as the host 12, on the network 14. If the connection control 92 is selected, the coordination module 106 invokes the connection module 104. The user is prompted for a destination workstation 12 and the connection module 104 transmits the formatted data file 74 to the destination workstation 12. The method ends at a block 230.

Thus, the present invention takes customized input data that was previously only usable on a workstation application 52 and makes it accessible for use by a host or another workstation running another application. The data file 56 comprises input data and the formatting achieved by the present invention is that of customized input data not of an end product. The data file 56 may be stored in one location, such as on the host, and yet can be used for both workstations and the host. Formatting of the data file 56 is automatic and transparent to the user. The requirement of printing the data file 56 and manually editing the data file 56 for compatibility is thereby eliminated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for formatting an input data file compatible with a workstation application into a formatted input data file compatible with a second application, the apparatus comprising:
    a processor for executing instructions; and
    a memory device storing modules executable by the processor, the modules comprising:
        said workstation application, the workstation application comprising:
            an index effective to match objects in the input data file to corresponding positions in the formatted input data file,
            parse rules effective to segment the positions of the objects in the formatted input data file,
            an update module configured to provide an update to the input data file, the update comprising customized settings provided by a user operating the workstation application, and
            a formatter configured to automatically review the input data file to determine if the input data file has received the update and, upon receipt of the update, automatically format the input data file into the formatted input data file, the formatter further configured to use the index and the parse rules to place and segment objects into corresponding positions in the formatted input data file.

2. The apparatus of claim 1 wherein the index is further effective to identify the data types of the objects, and the formatter is further configured to position the objects in the formatted input data file based on the data type of the objects.

3. The apparatus of claim 1 wherein the input data file is a parameter dictionary file and the formatted input data file is a partitioned data set file.

4. The apparatus of claim 1 wherein the modules further comprise one or more data file functions.

5. The apparatus of claim 4 wherein the one or more data file functions includes a file identification module configured to identify the formatted input data file.

6. The apparatus of claim 4 wherein the one or more data file functions includes a host connection module configured to upload the formatted input data file to a host containing the second application.

7. The apparatus of claim 4 wherein the modules further comprise:
    a window module configured to provide a window on a display device and containing one or more controls; and
    a coordination module operably linking the one or more controls with the data file functions such that the data file functions are selectively invokable by the one or more controls to manipulate the formatted input data file.

8. The apparatus of claim 1 wherein the customized settings are configured to affect operation of the workstation application and the second application.

9. The apparatus of claim 1 wherein the workstation application is an installer program configured to install a main program.

10. A method for automatically formatting an input data file resident within a first application into a formatted input data file compatible with a second application, the method comprising:
    incorporating an update into the input data file, the update comprising customized settings provided by a user operating the first application;
    providing an index to map objects in the input data file to corresponding locations in the formatted input data file;
    providing parse rules to segment the positions of the objects in the formatted input data file; and
    inserting the objects of the input data file into the formatted input data file without user intervention in accordance with the index and the parse rules.

11. The method of claim 10 further comprising reviewing the input data file to determine if the update has been incorporated into the input data file.

12. The method of claim 10 further comprising establishing that the update to the input data file is complete.

13. The method of claim 10 wherein the customized settings are configured to affect operation of the first and second applications.

14. The method of claim 10 further comprising providing one or more data file functions for manipulating the input data file.

15. The method of claim 14 further comprising:
    providing a window displayable on a display device;
    providing one or more controls within the window; and
    linking the one or more controls with the data file functions such that the data file functions are selectively invokable by the one or more controls to thereby manipulate the formatted input data file.

16. The method of claim 10 further comprising identifying the formatted input data file with an identifier.

17. The method of claim 10 further comprising uploading the formatted input data file to a host containing the second application.

18. The method of claim 10 wherein the input data file is a parameter dictionary and the formatted input data file is a partitioned data set file.

19. The method of claim 10 further comprising generating the input data file based on an initial input data file stored on a host and compatible with the second application.

20. A computer readable medium having stored thereon computer executable instructions for performing a method for automatically taking an input data file resident within a first application and formatting the input data file into a formatted input data file compatible with a second application, the method comprising:
    incorporating an update into the input data file, the update comprising customized settings provided by a user operating the first application;

providing an index to map objects in the input data file to corresponding locations in the formatted input data file;

providing parse rules to segment the positions of the objects in the formatted input data file; and automatically inserting the objects of the input data file into the formatted input data file without user intervention in accordance with the index and the parse rules.

21. The computer readable medium of claim 20 wherein the method further comprises automatically reviewing the input data file to determine if the update has been incorporated into the input data file.

22. The computer readable medium of claim 20 wherein the method further comprises automatically establishing that the update to the input data file is complete.

23. The computer readable medium of claim 20 wherein the customized settings are configured to affect operation of the first and second applications.

24. The computer readable medium of claim 20 wherein the method further comprises providing one or more data file functions for manipulating the formatted input data file.

25. The computer readable medium of claim 24 wherein the method further comprises:

providing a window displayable on a display device;

providing one or more controls within the window; and linking the one or more controls with the data file functions such that the data file functions are selectively invokable by the one or more controls to thereby manipulate the formatted input data file.

26. The computer readable medium of claim 20 wherein the method further comprises identifying the formatted input data file with an identifier.

27. The computer readable medium of claim 20 wherein the method further comprises uploading the formatted input data file to a host containing the second application.

28. The computer readable medium of claim 20 wherein the input data file is a parameter dictionary file and the formatted input data file is a partitioned data set file.

29. The computer readable medium of claim 20 wherein the method further comprises generating the input data file from an initial input data file stored on a host and compatible with the second application.

* * * * *